United States Patent
Cottyn et al.

(10) Patent No.: US 12,545,230 B2
(45) Date of Patent: Feb. 10, 2026

(54) METHOD FOR DRIVING AN EGO VEHICLE

(71) Applicant: AUDI AG, Ingolstadt (DE)

(72) Inventors: Dieter Cottyn, Stammham (DE);
Florian Pohl, Regensburg (DE);
Michael Wein, Seubersdorf (DE)

(73) Assignee: AUDI AG, Ingolstadt (DE)

( * ) Notice: Subject to any disclaimer, the term of this patent is extended or adjusted under 35 U.S.C. 154(b) by 329 days.

(21) Appl. No.: 17/956,581

(22) Filed: Sep. 29, 2022

(65) Prior Publication Data
US 2023/0099394 A1   Mar. 30, 2023

(30) Foreign Application Priority Data
Sep. 30, 2021   (DE) .......................... 102021125350.0

(51) Int. Cl.
| | | |
|---|---|---|
| *B60W 20/11* | (2016.01) | |
| *B60W 10/06* | (2006.01) | |
| *B60W 10/08* | (2006.01) | |
| *B60W 20/19* | (2016.01) | |

(52) U.S. Cl.
CPC ............ *B60W 20/11* (2016.01); *B60W 10/06* (2013.01); *B60W 10/08* (2013.01); *B60W 20/19* (2016.01); *B60W 2510/0657* (2013.01); *B60W 2710/0666* (2013.01); *B60W 2710/083* (2013.01)

(58) Field of Classification Search
CPC ...... B60W 20/11; B60W 10/06; B60W 10/08; B60W 20/19; B60W 2710/0666; B60W 2710/083
See application file for complete search history.

(56) References Cited

U.S. PATENT DOCUMENTS

| | | | | |
|---|---|---|---|---|
| 4,111,073 A | * | 9/1978 | Chana | B60W 10/04 477/41 |
| 6,360,151 B1 | * | 3/2002 | Suzuki | B62D 5/046 318/432 |
| 2011/0172862 A1 | | 7/2011 | Ortmann et al. | |
| 2014/0172215 A1 | * | 6/2014 | Bartels | B60W 20/10 701/22 |
| 2017/0267226 A1 | * | 9/2017 | Kopp | B60W 30/18072 |

(Continued)

FOREIGN PATENT DOCUMENTS

| | | | | |
|---|---|---|---|---|
| CN | 101454171 B | * | 11/2012 | .......... B60W 10/184 |
| CN | 102858613 A | | 1/2013 | |

(Continued)

*Primary Examiner* — Shelley Chen
(74) *Attorney, Agent, or Firm* — Seed Intellectual Property Law Group LLP

(57) ABSTRACT

Embodiments of the invention relate to a method for driving an ego vehicle in a defined speed range, wherein the ego vehicle has at least one drive unit, and for the at least one drive unit there is provided a characteristic curve specific to the drive unit for a speed-dependent maximum torque, wherein for the at least one drive unit of the ego vehicle a performance-specific characteristic curve depending on the characteristic performance class of the ego vehicle is established for a speed-dependent performance-specific characteristic torque which is less than the maximum torque, and a supplemental torque is established for the ego vehicle when driving in the defined speed range of the ego vehicle in addition to the performance-specific characteristic torque.

9 Claims, 1 Drawing Sheet

(56) References Cited

U.S. PATENT DOCUMENTS

| | | | |
|---|---|---|---|
| 2017/0267228 A1* | 9/2017 | Wein | B60K 6/52 |
| 2018/0141537 A1* | 5/2018 | Schobeß | B60L 15/2045 |
| 2019/0001805 A1* | 1/2019 | Colavincenzo | B60W 20/15 |
| 2019/0135280 A1* | 5/2019 | Kishi | B60W 40/1005 |
| 2020/0171959 A1* | 6/2020 | Kamino | B60L 15/2009 |
| 2020/0215910 A1* | 7/2020 | Stöbich | B60K 25/06 |
| 2022/0185284 A1* | 6/2022 | Dourra | B60W 20/19 |

FOREIGN PATENT DOCUMENTS

| | | | |
|---|---|---|---|
| CN | 105189172 A | | 12/2015 |
| CN | 111629946 A | | 9/2020 |
| DE | 102017108473 A1 | | 10/2018 |
| DE | 102019200125 A1 | | 7/2020 |
| JP | 2001254815 A | * | 9/2001 |
| JP | 2005185040 A | * | 7/2005 |
| JP | 2006238525 A | * | 9/2006 |
| JP | 2008222230 A | * | 9/2008 |
| JP | 2011005977 A | * | 1/2011 |
| WO | WO 2013054349 A2 | | 4/2013 |

* cited by examiner

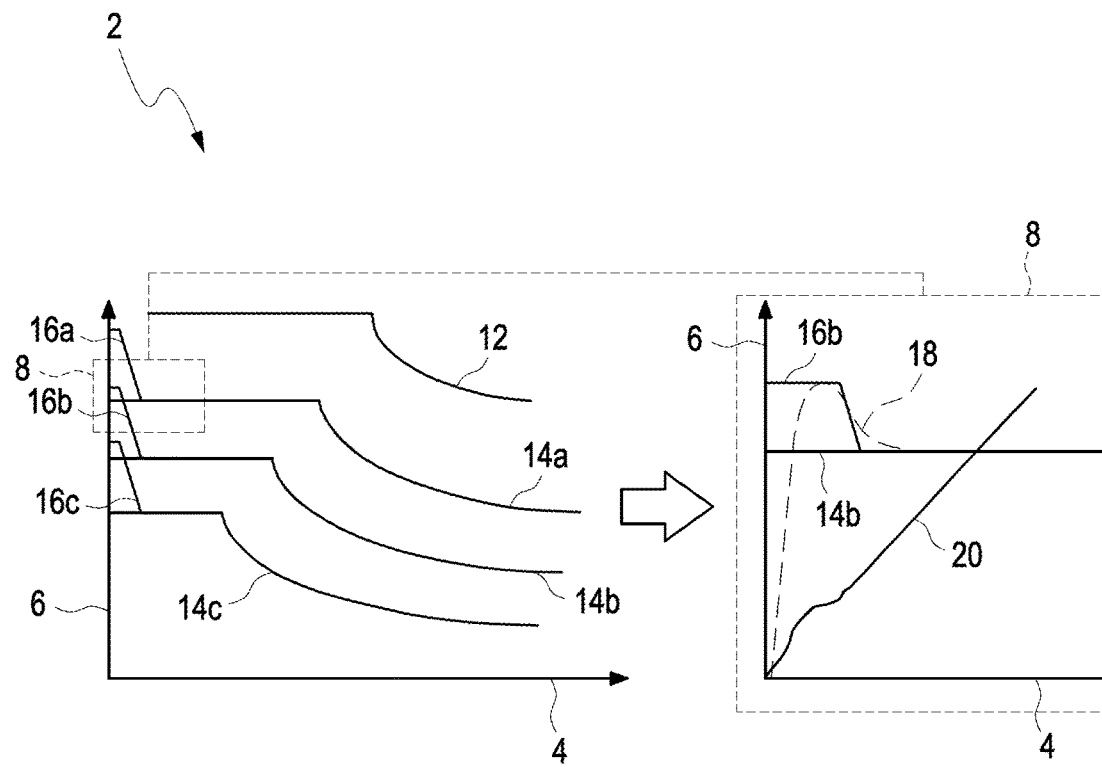

METHOD FOR DRIVING AN EGO VEHICLE

BACKGROUND

Technical Field

Embodiments of the invention relate to a method for driving an ego vehicle in a defined speed range and a system for driving an ego vehicle in a defined speed range.

Description of the Related Art

If a vehicle which has a small internal combustion engine (ICE) is heavily loaded while driving, a higher gear ratio or a converter clutch will be used for this vehicle. However, the resulting starting process due to the very pronounced steady behavior seems less sporty and dynamic, even with objectively good acceleration values. In general, an adapting of the gear ratio occurs when starting the vehicle with the internal combustion engine, making use of a starting element, such as a torque converter, which is usually combined with a torque converter lock-up clutch. In situations with starting on a hill and/or with a trailer, the torque demand is increased, making it all the more necessary to adapt the gear ratio and use the torque converter, which mechanically increases the torque.

Document US 2020/0171959 A1 describes an electric vehicle and a method for controlling it.

A torque assistance for an engine is known from document WO 2013/054349 A2.

One strategy for downshifting a transmission for a hybrid vehicle is known from document US 2011/0172862 A1.

Given this background, the problem to be solved was to carry out a suitable driving of a heavily loaded vehicle.

BRIEF SUMMARY

The method according some embodiments is proposed for driving an ego vehicle in a defined speed range, wherein the ego vehicle, such as a motor vehicle, has at least one drive unit. For the at least one drive unit there is provided a characteristic curve specific to the drive unit for a speed-dependent maximum torque. Furthermore, a performance class is defined and/or provided for the ego vehicle. A performance-specific characteristic curve depending on the characteristic performance class of the ego vehicle is established for a speed-dependent performance-specific characteristic torque which is less than the maximum torque for the at least one drive unit. Moreover, a supplemental torque is automatically established and/or provided for the ego vehicle when driving in the defined speed range of the ego vehicle in addition to the characteristic torque.

It is also possible to provide and/or set the maximum torque, the performance-specific characteristic torque and the supplemental torque, equivalent to the speed, in dependence on the revolutions of the at least one drive unit, in dependence on the number of revolutions.

In one embodiment it is provided that the method is carried out when starting the ego vehicle, i.e., when driving, starting from a speed of 0 km/h. The supplemental torque is provided and/or set when driving at low speed. An over-torque dependent on the speed and/or engine revolutions can then also be provided when the ego vehicle cannot be further accelerated in one embodiment, because it is heavily loaded, for example due to the overall weight being moved and/or transported. In the method, the ego vehicle is additionally accelerated by the supplemental torque.

A possible defined speed range comprises small two-digit values for the speed in kilometers per hour, such as a range of values from 0 km/h to 10 km/h, from 0 km/h to 20 km/h or from 0 km/h to 30 km/h. In particular, it is possible for the range to comprise speed values from 10 km/h to 20 km/h. The speed values pertain to an initial speed, with the ego vehicle being accelerated in addition from this initial speed by the supplemental torque to a higher speed. If a minimum speed value of the defined range should be 0 km/h, in which case the vehicle is initially standing still, the supplemental torque will be set accordingly upon starting the ego vehicle. It is possible for the supplemental torque to be especially effective in a range of 10 km/h to 20 km/h and to have a maximum value, for example. It is also possible for the build-up of the supplemental torque to be delayed in time by a driving behavior filter or a driving behavior filtering if the supplemental torque has already been provided in a range of 0 km/h to 10 km/h, but only works with maximum acceleration on the ego vehicle in a range of 10 km/h to 20 km/h.

The supplemental torque is automatically established and/or provided when the ego vehicle is additionally burdened during its driving, for example, upon starting, for example on a hill and/or due to a trailer, on account of an additional loading which occurs when driving, such as starting, on the hill and/or when pulling the trailer, on account of the additional weight being moved. The additional loading is detected automatically by at least one sensor. It is possible for the speed range at which the supplemental torque is established to begin at a value of 0 km/h, it being possible for the ego vehicle to accelerate rapidly or accelerate from zero, for example on a hill and/or with a trailer. As a rule, it is possible to adapt the magnitude of the enabled and/or provided supplemental torque as an over-torque and to adapt its availability while taking into account other operating parameters affecting the loading of the ego vehicle. One such operating parameter is the loading of the ego vehicle and thus its weight which is to be driven or propelled, such as accelerated. The loading and/or weight is determined for example by spring suspension sensors and/or a measurement sensor for the weight arranged in the chassis of the ego vehicle, and/or by estimating the weight, for example based on the driving resistance during travel.

Furthermore, a sum of the performance-dependent characteristic torque and the supplemental torque is set less than the maximum torque for the at least one drive unit. It is possible for the supplemental torque to also be set specific to the performance class. The at least one drive unit is configured as an electric motor and it is used and/or operated as an electric motor when driving in the defined speed range, such as when starting, and it transforms electrical energy from an energy source of the ego vehicle into mechanical energy for the driving of at least one driving wheel. Alternatively, it is possible for such an electric machine to be used and/or operated also as an electric generator. It is optionally conceivable for the ego vehicle to also comprise at least one internal combustion engine for the driving, the ego vehicle being designed or designated as a hybrid vehicle. The supplemental torque or a value of this supplemental torque is usually quantitatively established in the defined speed range, depending on the value of the speed and/or depending on a value of the engine revolutions of the at least one drive unit, i.e., the at least one electric machine and/or the at least one internal combustion engine or at least one combustion engine.

The supplemental torque is generally established by software-supported adaptation, supplementation, and/or parametrization of the performance-specific characteristic curve, comprising at least one speed-dependent curve, such as a characteristic curve, for the characteristic torque of the ego vehicle. It is possible for a respective value of the characteristic torque to be usually quantitatively increased by a respective value of the supplemental torque in the provided or defined speed range of the ego vehicle and/or the revolutions of the at least one drive unit or a corresponding drive machine. Given a uniform gear ratio of a transmission of the ego vehicle, the engine revolutions and the speed are largely proportional to each other and/or can be directly converted into each other.

The method is proposed in an embodiment for an ego vehicle having multiple drive units, such as n drive units, wherein for a k-th drive unit among the n drive units a k-th characteristic curve specific to the drive unit and at least one k-th characteristic is provided for a speed-dependent k-th maximum torque, and for the ego vehicle a common performance-specific characteristic curve dependent on its characteristic performance class, such as at least one performance-specific characteristic, is established for an overall speed-dependent performance-specific characteristic torque of all n drive units, being less than the sum of all n maximum torques of the n drive units, and a common supplemental torque is automatically established and/or provided for all n drive units for the ego vehicle when driving, for example starting, in the defined speed range of the ego vehicle, being distributed among all the drive units. It is possible for one drive unit to be associated with each driving wheel of the ego vehicle.

Furthermore, it is possible to carry out the method for an ego vehicle from a series of vehicles. Each vehicle of the series has at least one drive unit, such as n drive units, the at least one drive unit or each of the drive units being identical and/or uniform in design for all vehicles of the series. For the at least one identical and/or uniform drive unit of each vehicle of the series, which is arranged in each vehicle of the series, a series-wide and/or universal characteristic curve is provided for a series-wide and/or universal speed-dependent maximum torque for each vehicle, usually corresponding to the above described characteristic curve specific to the drive unit. Furthermore, for the vehicles of the series different performance classes are provided, wherein a characteristic performance class is provided for each vehicle or for the ego vehicle among the vehicles. The performance-specific characteristic curve is established for the speed-dependent performance-specific characteristic torque for each vehicle, depending on its performance class. If all the vehicles of the series have multiple or n drive units, a universal speed-dependent maximum torque is provided for every k-th drive unit of all the vehicles for this k-th drive unit. Furthermore, the performance-specific characteristic curve for the speed-dependent performance-specific characteristic torque is established for this k-th drive unit in the ego vehicle of a particular performance class. In a respective performance-specific characteristic curve for the ego vehicle, the speed-dependent performance-specific characteristic torque is less than the maximum torque and thus reduced as compared to the maximum torque, which also applies to the maximum possible value of the performance-specific characteristic torque.

In another possible embodiment of the method, a characteristic curve specific to the drive unit is provided for a speed-dependent maximum power for the at least one drive unit of the ego vehicle. Furthermore, depending on the characteristic performance class of the ego vehicle, a performance-specific characteristic curve for a speed-dependent performance-specific characteristic power is established for the ego vehicle, the characteristic power provided for the at least one drive unit being less than the maximum power of this at least one drive unit. Furthermore, a supplemental power is automatically established and/or provided for the ego vehicle when driving, for example when starting, in the defined speed range of the ego vehicle, the sum of the characteristic power and the supplemental power being less than the maximum power. It is possible for the supplemental power to result automatically when the supplemental torque is established while driving in the defined speed range of the ego vehicle. Alternatively or additionally, the supplemental power can also be directly established and/or provided. If the ego vehicle comprises n drive units, a k-th characteristic curve specific to the drive unit is provided for a speed-dependent k-th maximum power. If the ego vehicle is from the series, the at least one or the k-th drive unit will have the same and/or a uniform design for all vehicles of the series. For the at least one identical and/or uniform drive unit of each vehicle of the series, a series-wide and/or universal characteristic curve will be used for each vehicle for a series-wide and/or universal speed-dependent maximum power. Depending on the performance class of the ego vehicle, the performance-specific characteristic curve for the speed-dependent performance-specific characteristic power is or will be established for each vehicle depending on its performance class, being less than the universal speed-dependent maximum power when the drive unit is installed in the ego vehicle, the maximum characteristic power being reduced, such as throttled, with respect to the maximum power.

Furthermore, the driving behavior filtering is performed for the supplemental torque. The increasing of the characteristic torques by the supplemental torque which is provided and/or established in dependence on the respective performance class of the ego vehicle is chosen in connection with the driving behavior filtering, such that a harmonious build-up of the overall torque of the ego vehicle and only a slight increase in the power results during the driving, such as a starting, in the defined speed range. This gives the impression of a more sporty and dynamic driving performance, while changing only slightly the entire data, for example for an acceleration of the ego vehicle from 0 km/h to 100 km/h. Usually the acceleration from 0 km/h to 100 km/h takes several seconds, while the acceleration time is shorter as the performance class of the ego vehicle is higher. When the characteristic torque is increased by the supplemental torque, the acceleration time is shortened by only a fraction of a second, such as 0.1 s to 0.2 s. Moreover, a parametrization of the driving behavior filtering or the driving behavior filter attuned to the total or overall torque to be attained is realized. With the driving behavior filtering, a filtered supplemental torque is determined from the speed-dependent unfiltered characteristic torque dictated by the performance-specific characteristic curve, which prevents too fast a build-up of the total torque as the sum of the characteristic torque and the supplemental torque.

The driving behavior filtering is generally a time-based filtering for a torque which is desired by the driver of the ego vehicle and/or dictated for example by activating an input mode, usually a gas pedal. It is also possible for such a desired and/or dictated torque, for example a driver demand torque, to be dictated automatically in a piloted or automated or automatic driving of the vehicle, for example by a driver assist. In order to provide the desired torque, for which a target value is generally specified, the supplemental torque is established in the defined speed range. The driving behavior filtering may be configured as a time-based filtering or time filter, as a PT1 element, or as a more complex filter. It is generally possible to realize the driving behavior filtering through a feedback control transmission element, such as a LZI transmission element, and thus optionally with the PT1 element. In addition, gradient limitations can be implemented for the supplemental torque being established. Such gradient limitations are usually also dependent on a respective current value or magnitude of the torque, generally that of a total torque of the ego vehicle and are quantitatively established, being different each time, in dependence on the torque and in one embodiment also dependent on the speed and/or the engine revolutions. A gradient for limiting the supplemental torque is very flat or correspondingly low for low values of around 0 Nm or a few Nm up to a maximum of 5 Nm or 10 Nm, for example.

Such a filtering, for example a driving behavior filtering and/or gradient limitation for the supplemental torque results in a delayed build-up of the total torque, which increases the comfort upon rapid change in the torque desired or dictated by the driver and/or driver assist, for example. In this case, a maximum supplemental torque or a corresponding maximum value for this is only enabled with a delay. The driving behavior filtering is dependent on various operating parameters of the ego vehicle, such as its weight and/or the total weight being propelled, which is dependent on the load of the ego vehicle and any trailer being towed, and it can be set or adjusted alternatively or additionally by the driver as well by selecting an operating mode of the ego vehicle. For example, a sporty mode as the operating mode results in a reduced driving behavior filtering, whereas for example a comfort mode as the operating mode results in a stronger driving behavior filtering. If the driving behavior filtering is configured as a time filter or time filtering and is set, e.g., via the PT1 element, it is possible that the delay of the supplemental torque will not be set and/or realized proportional to the speed of the ego vehicle. If the ego vehicle is additionally loaded, for example by the trailer and/or on a hill, it is possible that the complete supplemental torque or a maximum value for this is already provided at a low speed, e.g., already from 0 km/h to 5 km/h or 10 km/h onward, so that the acceleration will not be slowed down and the desired speed will be quickly attained.

The system according to some embodiments is intended for driving, such as starting, an ego vehicle in a defined speed range of the ego vehicle, wherein the ego vehicle has at least one drive unit. The system comprises a computer unit and a memory, the memory being adapted to store at least one characteristic curve, usually comprising at least one characteristic. Usually one characteristic curve is provided for a speed-dependent maximum torque of the at least one drive unit, which can be stored or deposited in the memory. The memory is adapted to store a performance-specific characteristic curve for the at least one drive unit of the ego vehicle depending on a characteristic performance class of the ego vehicle, which is established for a speed-dependent performance-specific characteristic torque of the ego vehicle, being less than the maximum torque. The computer unit is adapted to automatically establish a supplemental torque for the ego vehicle upon starting in the defined speed range of the ego vehicle and to arrange for the supplemental torque to be provided by the at least one drive unit in addition to the characteristic torque.

It is possible for the supplemental torque to be automatically set by the computer unit, depending on a supplemental loading of the ego vehicle resulting from a weight being moved by the ego vehicle, while driving for example on a hill and/or on account of a trailer being hauled in the defined speed range, for example dependent on the speed, i.e., dependent on the absolute value of the speed within the range provided for this. It is possible to carry out one embodiment of the proposed method with one embodiment of the proposed system.

With the method and the system, it is possible to increase, for example when starting, the characteristic drive torque as the characteristic torque for an electrically driven ego vehicle and/or in an electrically driven ego vehicle, being increased by a supplemental driving torque as a supplemental torque in the speed range. Each characteristic curve described, i.e., the performance-specific characteristic curve, the at least one, for example the k-th characteristic curve specific to the drive unit, and/or the universal and/or series-wide characteristic curve has at least one speed-dependent characteristic, for example multiple characteristics, for the respective torque and/or a respective power.

By using the method and the system, the speed-dependent performance-specific characteristic curve and thus at least one demandable and/or available torque of the at least one drive unit is trimmed in a low speed range of, for example, 0 km/h to 10 km/h and/or 10 km/h to 20 km/h, in one embodiment from 0 km/h to 20 km/h, taking into account the supplemental torque, and furthermore an application of the driving behavior filtering is specifically adapted accordingly to the characteristic curve, wherein said demandable torque when driving in the defined speed range is obtained from the characteristic torque plus the supplemental torque. The demandable and/or available torque is not increased by the supplemental torque in a sweeping broad manner, but only in a selected speed range starting from the characteristic torque, and a target value to be attained for the total torque is dictated, resulting from the value of the characteristic torque and a value of the supplemental torque. It is possible to boost the driving performance and traction of the ego vehicle in the low speed range while maintaining the performance differentiation for different vehicles of a series, provided for the different performance classes, as dictated by the marketing and pricing, the ego vehicle being part of this series. At the same time, attention is paid to one aspect of the drivability, i.e., the build-up and corresponding increasing of the torque, controlled by the driver, starting from the performance-specific characteristic torque, while driving, such as starting, the ego vehicle.

In order to perform the driving of the ego vehicle, such as the starting of the ego vehicle, a target value is dictated for the total torque with the performance-specific characteristic curve for the characteristic torque, which is increased by the supplemental torque, which is or should be attained by the at least one drive unit of the ego vehicle.

A curve for the total torque which is provided for this has a relatively high value at the low speed, when the characteristic torque is increased by the supplemental torque, and this value drops off to a constant value with increasing speed or a corresponding increase in the speed, since the supplemental torque is not established for higher speeds. This constant value lies in a power hyperbola upon reaching a given power or a corresponding target value for the power, which in one embodiment results from the characteristic power plus the supplemental power.

The method is intended for an ego vehicle which comes from a series having different vehicles. All of the vehicles of the series comprise the same at least one drive unit. Since different performance classes are provided for the vehicles of the series, there is provided and/or usually established with software support a maximum torque, i.e., characteristic torque, and/or a maximum power, i.e., characteristic power, for the ego vehicle of a particular performance class among all the vehicles according to the performance-specific characteristic, the maximum attainable torque and/or the maximum attainable power being higher as the performance class is higher for the respective ego vehicle within the series.

With the supplemental torque in the respective performance class of the ego vehicle, the increasing of the available characteristic torque is parametrized into the performance-specific characteristic curve, the performance-specific characteristic curve being supplemented with data for this by the given increase according to the supplemental torque. Since the performance-specific maximum torque and/or a performance-specific maximum power for the at least one drive unit is greater than the characteristic torque and/or the characteristic power plus the supplemental torque and/or the supplemental power, a corresponding increase in the propulsion based on a uniform drive for all the vehicles of the series or the at least one drive unit of the respective ego vehicle is possible, since the reserves for the supplemental torque and/or the supplemental power that are needed for this are present. It is possible to adapt the drive provided for the ego vehicle or the at least one drive unit by a software-supported adaptation, for example, a throttling of the unit drive.

The method is carried out while driving, e.g., during the starting process of the ego vehicle in the defined speed range, e.g., with a trailer on a hill or during a splitting (torque or μ-splitting) of the total torque resulting from the sum of the characteristic torque and the supplemental torque for multiple driving wheels of the ego vehicle. The torque for a respective driving wheel in one possible embodiment is supported by a one-sided brake pressure acting on the driving wheel, which reduces the actual propulsion-effective torque of the driving wheel. Even when the ego vehicle in such a case is hardly or only very slowly increasing in speed, the increasing of the respective characteristic torque provided by the supplemental torque is available longer to the driver and enables a superior driving, e.g., a superior starting process.

Furthermore, it is possible to achieve subjectively a distinctly more dynamic driving, such as a distinctly more dynamic starting process, in the defined speed range. Objectively, the traction of the ego vehicle is distinctly improved. This is also possible in a battery operated ego vehicle (BEV) with low performance class or power stage. Moreover, the acceleration of the ego vehicle from 0 km/h to 100 km/h is shorter and thus improved. Moreover, a price-relevant power spectrum for different vehicles of the same series having drives of different power or with different performance classes can be maintained. No additional hardware or software costs are incurred, since only existing or already available software is parametrized by adapting the performance-specific characteristic curve of the ego vehicle and thus supplemented and/or adapted with data for a speed-dependent increase or enhancement based on the supplemental torque.

With the usual electric drive of the ego vehicle, it is possible to put out the supplemental torque needed for the enhancement, starting from an engine speed of 0 rpm and/or a speed of the ego vehicle of 0 km/s, even with direct coupling to the driving wheels across a transmission and with no starting element, at least in the given speed range, a maximum torque of the drive resulting from the characteristic torque and the supplemental torque.

Furthermore, a defined maximum characteristic torque is originally established for the ego vehicle for its performance class by software and/or parametrization. The performance-specific characteristic curve for the characteristic torque of the ego vehicle is originally parametrized depending on its performance class. Utilizing the performance-specific characteristic curve, at first the characteristic torque defined for the ego vehicle is put out as the maximum driving torque, for example constantly, starting at an engine speed of 0 rpm and/or a speed of the ego vehicle of 0 km/h, resulting in a steady driving, e.g., a steady starting process. Now, in the method, it is provided that the originally provided maximum characteristic torque, depending on the respective performance class, is increased by the additional supplemental torque provided for the enhancement. It is possible for the performance class of the ego vehicle to be increased briefly by the supplemental torque and possibly also by the supplemental power at least during the driving, for example, during the starting, at low speed, in the range defined or provided for this, canceling out the throttling of the maximum torque and/or maximum power of the at least one drive unit to the originally provided performance class and thus to the performance-specific characteristic torque and/or the performance-specific characteristic power while driving, e.g., starting.

This is provided, e.g., in a special situation, for example while driving, especially starting, the ego vehicle with a trailer on a hill. Although originally the ego vehicle has a low performance class and thus not enough traction force, the traction force is increased by increasing the characteristic torque with the supplemental torque, since the at least one drive unit is designed to also generate a larger traction force, which would otherwise be reduced and/or throttled accordingly, depending on the performance class originally provided for the ego vehicle.

In one embodiment, the ego vehicle or its driving wheels are driven directly with the at least one drive unit, doing without the otherwise customary adaptation of a gear ratio. It is possible to increase the total torque and/or the total power of the ego vehicle while driving, e.g., starting, depending on the speed. The increasing of the usually provided converter clutch is simulated and/or modeled. For this, the performance-specific characteristic curve, possibly containing multiple curves, is simply adapted with software support, all of the curves being adapted accordingly. It is thus possible to form the total torque from the characteristic torque originally provided for the ego vehicle, dependent on the performance class, and the supplemental torque provided for the enhancement.

It is proposed that the ego vehicle to have multiple sensors for recognizing the uphill gradient and/or an attached trailer, for example, multiple initial sensors for multiple spatial directions, a gradient sensor, and a mass sensor. The computer unit or a corresponding computing platform of the ego vehicle is designed, e.g., as a High Performance Computing Platform (HCP). Furthermore, the ego vehicle comprises a rotary speed sensor for the driving wheels and the at least one drive unit. Moreover, the ego vehicle has an integrated rotary speed governor with a vibration dampening in the at least one drive unit. In order to provide the supplemental torque, the rotary speed of the at least one drive unit and/or at least one driving wheel is taken into account. In the method, furthermore, a cooperative regulation concept is provided with a traction control (ASR) and differential lock (EDS). Thanks to a corresponding enhancement, sufficient propulsion reserves are provided in the method for the total torque of the at least one drive unit and its power. The performance-specific characteristic curve for the characteristic torque and the characteristic power is adapted with drive software specific to the performance class, which is provided by the computer unit and/or the memory.

The above-mentioned features and those yet to be explained in the following can be used not only in the particular indicated combination, but also in other combinations or standing alone.

BRIEF DESCRIPTION OF THE SEVERAL VIEWS OF THE DRAWINGS

Embodiments of the invention are represented schematically with the aid of the drawing and shall be described schematically and in detail with reference to the drawing.

FIG. 1 shows in schematic representation a diagram with operating parameters of an ego vehicle, which is used in one embodiment.

Diagram 2 of FIG. 1 comprises an abscissa 4 and an ordinate 6. Furthermore, there is shown here a box 8 with broken border line, in which a feature of diagram 2, shown here at right, is represented with enlargement and detail next to diagram 2.

DETAILED DESCRIPTION

In some embodiments, a system is intended for an ego vehicle, such as a motor vehicle, wherein the system also comprises a computer unit and a memory of the ego vehicle for implementing, i.e., for checking and thus controlling and/or regulating the embodiment of the method.

It is provided here that the ego vehicle comes from a series encompassing multiple different vehicles, such as motor vehicles. Each of these vehicles of the series comprises a drive unit, usually an electric machine, which is identical for all the vehicles of this series and thus is designed as a uniform drive unit.

In diagram 2, the speed of vehicles and of the ego vehicle is plotted along the abscissa 4. Along the ordinate 6 there are plotted, as the operating parameter of a respective vehicle and of the ego vehicle, its torque, such as the driving torque, and its power.

For the drive unit, which is identical or uniform in design for all the vehicles of the series, a curve 12 which is specific to the drive unit or series-wide is provided for a speed-dependent maximum torque of this drive unit. During the fabrication of the vehicles of the series, this drive unit is installed in each of these vehicles. However, it is provided that different performance classes exist and/or are established for different vehicles of the series.

For a first vehicle of a first performance class, here the highest class, a first performance-specific curve 14a is established for a first maximum characteristic torque of this vehicle of the first performance class by a first performance-specific curve 14a. Furthermore, for a vehicle of a second lower performance class, a maximum characteristic torque is established and/or defined by a second performance-specific curve 14b. Furthermore, for a vehicle of a third performance class, a third performance-specific curve 14c is established and/or defined for a maximum characteristic torque of this vehicle of the third performance class.

It is provided that the maximum torque for all speeds is greater than the first supplemental torque for the vehicle of the first performance class, which in turn is greater than the supplemental torque for the vehicle of the second performance class, which in turn is greater than the supplemental torque for the vehicle of the third performance class.

Diagram 2 of FIG. 1 moreover shows supplemental torques 16a, 16b, 16c, namely, a first supplemental torque 16a for the first characteristic torque, a second supplemental torque 16b for the second characteristic torque according to the second curve 14b and a third supplemental torque 16c for a third characteristic torque according to the third curve 14c.

It is provided that the vehicle of the second performance class here is also configured or designated as the ego vehicle at the same time, for which the embodiment of the method will be described as an example.

The embodiment of the proposed method is then carried out in a configuration where the ego vehicle is driving, such as starting, on a hill or an incline, and in addition it must haul a trailer as an additional load. It is considered here that the maximum torque according to the maximum characteristic for the unthrottled drive unit is sufficient for this. On the other hand, the characteristic torque of the vehicle of the second performance class and thus that of the ego vehicle according to the second characteristic curve 14b would be too little. It is provided in the method that the second supplemental torque 16b is applied and/or provided in addition to the characteristic torque in a defined speed range, for example, at a low speed of 0 km/h to 10 km/h or 20 km/h during travel, i.e., while driving, such as starting, the ego vehicle, this speed being at most 20 km/h, for example.

In this regard, also refer to the cutout feature of diagram 2. This shows that the characteristic torque provided according to the second performance class for the ego vehicle is increased by the second supplemental torque 16b, and for the total torque a target value is provided, resulting from the sum of the characteristic torque plus the second supplemental torque 16b. A total, usually real torque or actual torque of the ego vehicle provided while driving, such as starting, is represented in the cutout feature of diagram 2 by a dotted curve 18. Furthermore, another curve 20 is also shown in this cutout, representing the speed-dependent variation of the power of the ego vehicle, this total power of the ego vehicle resulting from a characteristic power, dependent on the performance class, and a supplemental power, although this is only provided while driving, such as starting, in the defined and/or provided speed range. In the method, a curve is used for the ego vehicle comprising the second characteristic curve 14b as the curve for the performance class of the ego vehicle, which is additionally supplanted and thus parametrized by the second supplemental torque 16b, usually by data for the second supplemental torque 16b, comprising data for the characteristic curve.

Each curve 12, 14a, 14b, 14c shown in diagram 2 for the maximum torque and a respective characteristic torque has a constant maximum value at low speed values, which decreases in view of a power hyperbola of a particular vehicle or the ego vehicle at higher speed values, taking into account the maximum value of the power hyperbola of a particular vehicle.

In the method, it is provided that the characteristic torque while driving, such as starting, at the low speed in the range defined for this is enhanced and thus trimmed by the supplemental torque.

The total characteristic torque, which is originally constant for low speeds, is enhanced by the supplemental torque in the low speed range, while the total torque at higher speeds again corresponds to the characteristic torque, so that only the starting ability, but not the accelerating ability of the ego vehicle is influenced.

In a configuration furthermore with a driving behavior filtering, the characteristic torque of the ego vehicle is increased very quickly, or suddenly, by the supplemental torque. Such an increase makes possible a comfortable driving, such as a starting. Although the real total torque according to the curve 18 is reduced with respect to the sum of the characteristic torque and the third supplemental torque 16c, the driving behavior of the ego vehicle can be adapted quickly and comfortably to a demand for a target value of the total torque. The total torque for the ego vehicle is built up harmoniously. This is possible, for example, with a filter function, such as a PT1 filter or a PT1 element, a ramp limitation, a gradient limitation and/or a rounding, thereby adapting the variation of the total torque.

The acceleration of the ego vehicle is throttled or limited by software. Although a total acceleration of the particular ego vehicle from 0 km/h to 100 km/h is maintained by a described spread of the performance classes, the driving, such as the starting ability of the ego vehicle belonging to a relatively low performance class is improved, without increasing its acceleration, the time for the acceleration of the ego vehicle being little if at all influenced by the increasing of the total torque.

German patent application no. 10 2021 125350.0, filed Sep. 30, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for driving an ego vehicle in a defined speed range, wherein the ego vehicle has at least one drive unit, and for the at least one drive unit there is provided a characteristic curve specific to the drive unit for a speed-dependent maximum torque, the method comprising:
   establishing, for the at least one drive unit of the ego vehicle, a performance-specific characteristic curve that is based on a characteristic performance class of the ego vehicle, for a speed-dependent performance-specific characteristic torque which is less than the speed-dependent maximum torque;
   establishing a supplemental torque for the ego vehicle when driving in the defined speed range of the ego vehicle in addition to the speed-dependent performance-specific characteristic torque, wherein the defined speed range of the ego vehicle is between a first speed of the ego vehicle and a second speed of the ego vehicle, and wherein at least the second speed of the ego vehicle is a distance that the ego vehicle moves per unit of time;
   controlling, by a computer of the ego vehicle, the at least one drive unit to have the speed-dependent performance-specific characteristic torque indicated by the performance-specific characteristic curve when the ego vehicle drives outside of the defined speed range of the ego vehicle; and
   controlling, by the computer of the ego vehicle, the at least one drive unit to have a total torque corresponding to the supplemental torque in addition to the speed-dependent performance-specific characteristic torque when the ego vehicle drives in the defined speed range of the ego vehicle, including performing driving behavior filtering that delays in time build-up of the supplemental torque only if the supplemental torque has already been provided in a first portion of the defined speed range of the ego vehicle but only works with maximum acceleration on the ego vehicle in a second portion of the defined speed range of the ego vehicle different from the first portion of the defined speed range of the ego vehicle, wherein a curve corresponding to the total torque has a relatively high value at the first speed of the ego vehicle and drops off to a constant value with increasing speed.

2. The method according to claim 1, which is carried out when starting the ego vehicle.

3. The method according to claim 1, in which the defined speed range is 0 km/h to 30 km/h.

4. The method according to claim 1, in which the supplemental torque is automatically provided when the ego vehicle is additionally loaded.

5. The method according to claim 1, in which a sum of the speed-dependent performance-specific characteristic torque and the supplemental torque is established which is less than the speed-dependent maximum torque.

6. The method according to claim 1, in which the supplemental torque is established by software-supported data of the performance-specific characteristic curve.

7. The method according to claim 1 for an ego vehicle having n drive units, wherein for a k-th drive unit among the n drive units a k-th characteristic curve specific to the drive unit is provided for a speed-dependent k-th maximum torque, and for the ego vehicle a common performance-specific characteristic curve dependent on its characteristic performance class is established for an overall speed-dependent performance-specific characteristic torque of all n drive units, being less than a sum of all n maximum torques of the n drive units, and a common supplemental torque is established for all n drive units for the ego vehicle when driving in the defined speed range of the ego vehicle.

8. The method according to claim 1 for an ego vehicle from a series of vehicles, where each vehicle of the series has at least one identical drive unit which is identical in design for all vehicles of the series, wherein for the at least one identical drive unit of each vehicle of the series a universal characteristic curve is provided for a universal speed-dependent maximum torque, and for the vehicles of a series different performance classes are provided, wherein the performance-specific characteristic curve is established for the speed-dependent performance-specific characteristic torque for the ego vehicle based on the characteristic performance class of the ego vehicle.

9. A system for driving an ego vehicle in a defined speed range, wherein the ego vehicle has at least one drive unit, the system comprising:
   a computer, and
   a memory,
   wherein a characteristic curve specific to the drive unit is provided for a speed-dependent maximum torque of the at least one drive unit,
   wherein the memory stores a performance-specific characteristic curve for the at least one drive unit of the ego vehicle that is based on a characteristic performance class of the ego vehicle, with which a speed-dependent performance-specific characteristic torque is to be established, which is lower than the speed-dependent maximum torque, and the computer, in operation, automatically establishes a supplemental torque in addition to the speed-dependent performance-specific characteristic torque for the ego vehicle when driving in the defined speed range of the ego vehicle,
   wherein the defined speed range of the ego vehicle is between a first speed of the ego vehicle and a second speed of the ego vehicle, and wherein at least the second speed of the ego vehicle is a distance that the ego vehicle moves per unit of time, wherein the computer, in operation, controls the at least one drive unit to have the speed-dependent performance-specific characteristic torque indicated by the performance-specific characteristic curve when the ego vehicle drives outside of the defined speed range of the ego vehicle, wherein the computer, in operation, controls the at least one drive unit to have a total torque corresponding to the supplemental torque in addition to the speed-dependent performance-specific characteristic torque when the ego vehicle drives in the defined speed range of the ego vehicle, wherein a curve corresponding to the total torque has a relatively high value at a first speed of the ego vehicle and drops off to a constant value with increasing speed, and wherein the computer, in operation, performs driving behavior filtering that delays in time build-up of the supplemental torque only if the supplemental torque has already been provided in a first portion of the defined speed range of the ego vehicle but only works with maximum acceleration on the ego vehicle in a second portion of the defined speed range of the ego vehicle different from the first portion of the defined speed range of the ego vehicle.

* * * * *